(12) United States Patent
Schroeder

(10) Patent No.: US 7,159,847 B2
(45) Date of Patent: Jan. 9, 2007

(54) SUPPLEMENTARY CONTROL VALVE DEVICE FOR THE INLET CHANNEL OF A RECIPROCATING INTERNAL COMBUSTION ENGINE

(75) Inventor: Lothar Schroeder, Karben (DE)

(73) Assignee: Siemens AG, München (DE)

(*) Notice: Subject to any disclaimer, the term of this patent is extended or adjusted under 35 U.S.C. 154(b) by 66 days.

(21) Appl. No.: 10/516,014

(22) PCT Filed: Jun. 4, 2004

(86) PCT No.: PCT/EP2004/051032

§ 371 (c)(1),
(2), (4) Date: Nov. 29, 2004

(87) PCT Pub. No.: WO2005/001256

PCT Pub. Date: Jan. 6, 2005

(65) Prior Publication Data

US 2005/0205828 A1 Sep. 22, 2005

(30) Foreign Application Priority Data

Jun. 30, 2003 (DE) ............................. 103 29 400

(51) Int. Cl.
*F16K 1/00* (2006.01)
(52) U.S. Cl. ................. 251/359; 251/900; 137/909
(58) Field of Classification Search ............. 251/359, 251/900; 137/909; 141/DIG. 1
See application file for complete search history.

(56) References Cited

U.S. PATENT DOCUMENTS

| | | | | |
|---|---|---|---|---|
| 4,794,890 A * | 1/1989 | Richeson, Jr. | ............ | 123/90.11 |
| 5,022,358 A * | 6/1991 | Richeson | ............ | 123/90.12 |
| 5,873,337 A * | 2/1999 | Binford | ............ | 123/90.37 |
| 6,202,616 B1 * | 3/2001 | Gracyalny | ............ | 123/188.5 |
| 6,609,700 B1 * | 8/2003 | Leimer | ............ | 251/214 |
| 6,752,398 B1 * | 6/2004 | McArthy | ............ | 277/502 |
| 2002/0117140 A1 * | 8/2002 | McArthy | ............ | 123/188.6 |

FOREIGN PATENT DOCUMENTS

| | | |
|---|---|---|
| DE | 3626681 A1 | 1/1988 |
| DE | 10137828 A1 | 2/2003 |
| EP | 0599195 A1 | 6/1994 |
| EP | 1267067 A1 | 12/2002 |

OTHER PUBLICATIONS

Derwent-Abstract—EP 1267067A1; Dec. 18, 2002; Bayerische Motoren Werke Aktiengesellschaft, D-80809 München (Germany).
Derwent-Abstract—EP0599195A1; Jun. 1, 1992; Bayerische Motoren Werke Aktiengesellschaft, D-80809 München (Germany).
Derwent-Abstract—DE10137828A1; Feb. 20, 2003; Meta Motoren- und Energietechnik GmbH; D-52134 Herzogenrath (Germany).
Derwent-Abstract—DE 3626681A1; Jan. 14, 1988; Dipl.-Ing. Arne Walde, D-6072 Dreieich (Germany).

* cited by examiner

*Primary Examiner*—J. Casimer Jacyna
(74) *Attorney, Agent, or Firm*—Siemens AG

(57) ABSTRACT

The additional control valve device has a valve element which is guided between a gantry magnet and a trapping magnet in a reversibly movable manner in the direction of the longitudinal axis. An encircling seal is arranged on that side of the housing, in which the gantry magnet is arranged, which faces the valve element.

17 Claims, 3 Drawing Sheets

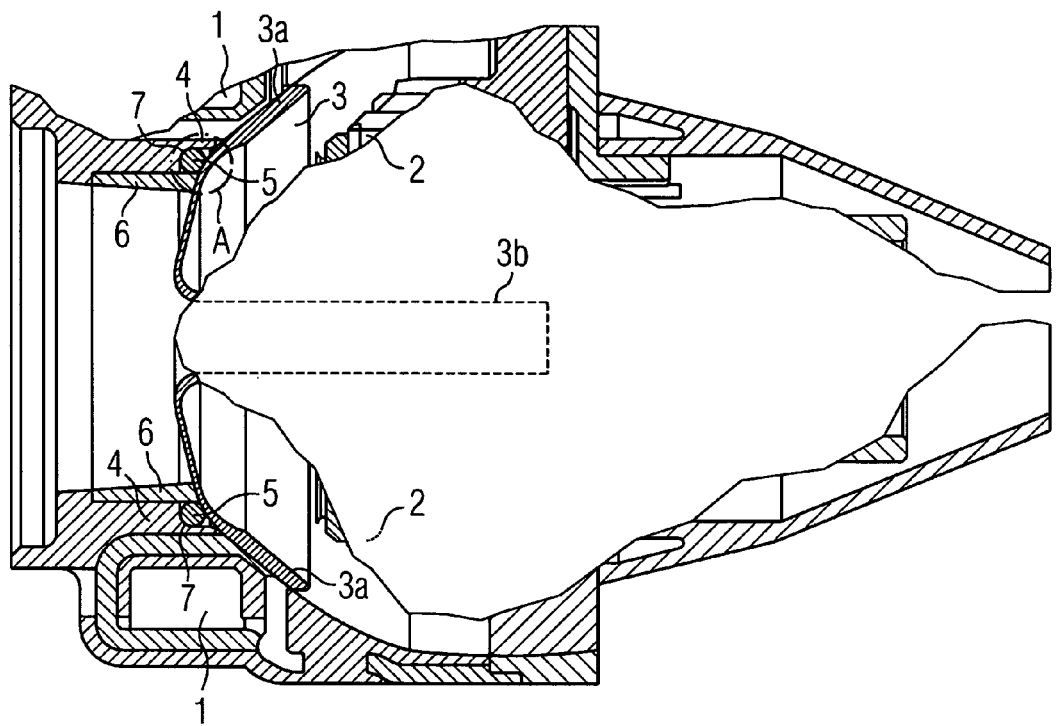
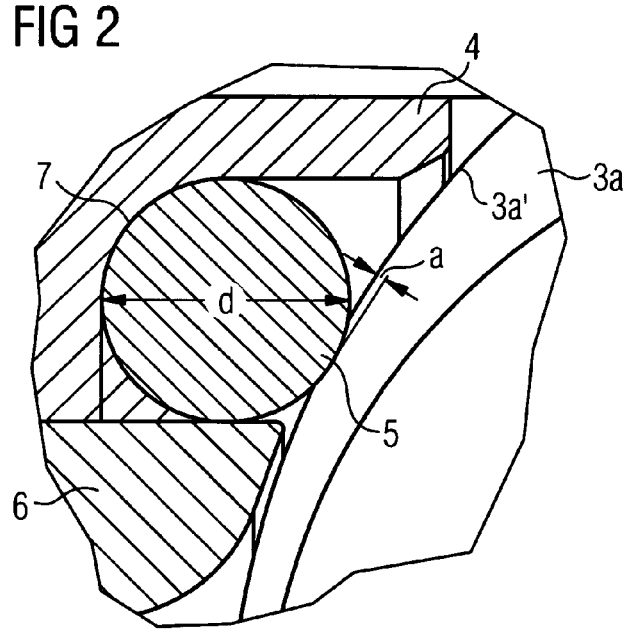

SUPPLEMENTARY CONTROL VALVE DEVICE FOR THE INLET CHANNEL OF A RECIPROCATING INTERNAL COMBUSTION ENGINE

BACKGROUND OF THE INVENTION

The invention relates to an additional control valve device for an inlet duct of a piston-type internal combustion engine. Additional control valve devices are known. An additional control valve device which is arranged in an inlet duct of a piston-type internal combustion engine is described in DE 101 37 828 A1. In this additional control valve device, there is provision for a valve element to be arranged which is of essentially mushroom-shaped design and which is guided in a reversibly movable manner in the direction of the longitudinal axis of the additional control valve device. In this valve element, a hat-shaped plate, which is formed convexly with an apex point toward the side facing away from the inlet valve, is arranged on a stem. The actual frequency of the system which is capable of oscillating is provided by spring constants and the weight of the valve element. The stem of the valve element ends at a collar. A first spring is supported between the collar and the bottom of the blind hole in which the stem is guided. A further spring is supported between the collar and the other end of the blind hole. In this way, the valve element forms, together with the two springs, a system which is capable of oscillating and which is held in a central position by the springs. This ensures that it is possible to change extremely quickly between the open position and the closed position, the gantry magnet and the trapping magnet, between which the valve element is guided in a reversibly movable manner, in each case only having to apply the holding force, and the kinetic energy being stored in the springs. However, a disadvantage of this additional control valve device is that the valve seat has to fulfill three functions on its own. Firstly, adequate sealing of the valve element in respect of the difference in pressure between the ambient pressure and the negative pressure produced by the engine has to be ensured at the valve seat. In addition, the valve seat acts as a stop, i.e. has to absorb the correspondingly active impact forces. Furthermore, the valve seat has to have the required magnetic properties, so that relatively small switching times between the open and the closed position of the additional control valve device can be realized. However, the simultaneous optimization of these three functions on the valve seat has turned out to be problematic, and so compromises have to be made in each case, which is not desirable.

SUMMARY OF THE INVENTION

The invention is based on the object of providing an additional control valve device for an inlet duct of a piston-type internal combustion engine, in which a good sealing action, a relatively good absorption of the impact forces and relatively good magnetic properties can be realized at the same time.

The object on which the invention is based is achieved by an additional control valve device for an inlet duct of a piston-type internal combustion engine, having a valve element which is guided between a gantry magnet and a trapping magnet in a reversibly movable manner in the direction of the longitudinal axis, in which an encircling seal is arranged on that side of the housing, in which the gantry magnet is arranged, which faces the valve element. The terms gantry magnet and trapping magnet are to be understood in each case as the combination of magnet and magnet yoke. The valve element concerns the combination of a stem and a hat-shaped plate, which is formed convexly with an apex point toward the side which faces away from the inlet valve. The encircling seal is of annular and continuous design. It consists of, for example, an elastomer and has a round cross section. Its diameter depends on the size of the additional control valve device and in terms of engineering is designed in each case in such a manner that, when an optimum sealing action is reached, the valve element bears against the valve seat. The encircling seal can be fastened to the housing, for example, by means of a latching connection or by bonding. It has surprisingly been shown that the arrangement of the seal enables the additional control valve device to have a relatively high sealing action. At the same time, the seal serves to absorb impact forces, with the result that the valve seat now has to be designed in terms of structure merely in respect of optimum magnetic properties. This has the effect that the sealing action, the absorption of the impact forces and the magnetic properties can be virtually optimized in the desired manner. This is achieved by only a small structural outlay.

One preferred refinement of the invention involves the seal being bounded on one side by a metallic shaped insert which is fixed on the housing. The metallic shaped insert is, for example, an insert of annular design in a continuously encircling manner and is connected to the housing. The fixing takes place in this case by means of a screw connection or rivet connection, for example. However, it is also possible, under certain conditions, to fix the metallic shaped insert to the housing by means of a bonding connection. The arrangement of a metallic shaped insert is advantageous, since the housing has to be machined only slightly for the arrangement of the seal. Older additional control valve devices, the housing of which, in which the gantry magnet is arranged, is initially unsuitable for the arrangement of a seal, may therefore also be retrofitted with a seal in a relatively simple manner, since the seal can be arranged in a relatively simple manner by means of the metallic shaped insert, which acts as an abutment.

According to a further preferred refinement of the invention, the seal is arranged in an encircling groove. In some case, the placing of the seal into an encircling groove is advantageously sufficient in order to adequately fix the seal. In the case of relatively large forces acting in the additional control valve device, the encircling groove can be wetted with an adhesive before the seal is placed into the encircling groove. Adequate fixing of the seal is then ensured even in the case of relatively large forces.

A further refinement of the invention involves the encircling groove being arranged completely in a further metallic shaped insert belonging to the housing. This metallic shaped insert may also be, for example, of annular design. It is advantageous in this case that a subunit, formed from the metallic shaped insert and the encircling seal, can be fitted in a relatively simple manner into additional control valve devices which are already present, which advantageously facilitates the retrofitting of older additional control valve devices.

According to a further refinement of the invention, there is provision for the encircling seal to have a projection, and the encircling groove to have a cutout designed in a complementary manner to the projection. It is advantageous in this case that the encircling seal can be fixed in a relatively simple manner in the encircling groove by its projection being clamped into the cutout designed in a complementary manner. Then, even in the case of relatively high forces which act in the additional control valve device, the arrangement of additional adhesive can be omitted.

A further preferred refinement of the invention involves a flat ring seal being arranged as the seal. Flat ring seals are suitable for many intended uses in the additional control valve device and can be fixed in a relatively simple manner to the housing.

According to a further preferred refinement of the invention, a lip seal is arranged as the seal. This is particularly advantageous if high damping properties are required during operation of the additional control valve device.

According to a further preferred refinement of the invention, the seal has an S-shaped cross section. The S-shape may also be of distorted design. It does not therefore have to correspond precisely to the shape of the letter S. It is advantageous here that relatively high damping properties can also be achieved.

BRIEF DESCRIPTION OF THE SEVERAL VIEWS OF THE DRAWINGS

The invention is explained in greater detail and by way of example below with reference to the drawing (FIG. 1 to FIG. 3, FIG. 4a) to d), FIG. 5 to FIG. 7).

FIG. 1 shows the additional control valve device in longitudinal section.

FIG. 2 shows the enlarged detail A from FIG. 1.

DETAILED DESCRIPTION OF THE INVENTION

Figure 3:
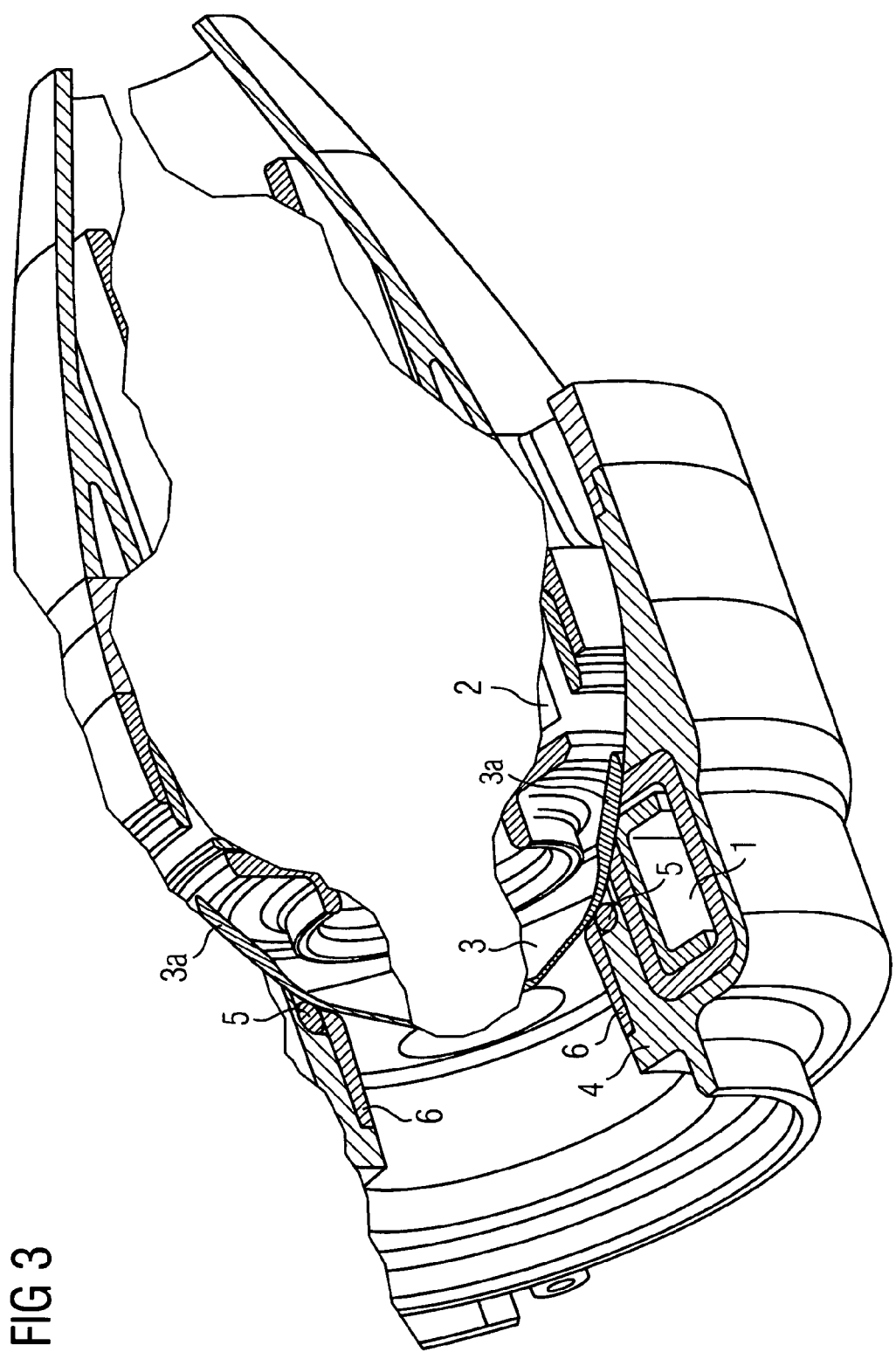
FIG. 3 shows the additional control valve device in longitudinal section in three-dimensional form.

FIG. 1 illustrates the additional control valve device for an inlet duct of a piston-type internal combustion engine in longitudinal section having a valve element 3 which is guided between a gantry magnet 1 and a trapping magnet 2 in a reversibly movable manner in the direction of the longitudinal axis. The valve element 3 comprises a valve plate 3a and a stem 3b arranged on the valve plate 3a. The illustration of the inner parts of the additional control valve device has been omitted for reasons concerned with clarity. The gantry magnet 1 is arranged in a housing 4. An encircling seal 5 is arranged on that side of the housing 4, in which the gantry magnet 1 is arranged, which faces the valve element 3. In this case, the encircling seal 5 has a circular cross section and is bounded on one side by a metallic shaped insert 6 which is fixed to the housing 4. This metallic shaped insert 6 is of annularly encircling design. In addition, the encircling seal 5 is arranged in an encircling groove 7, which has an advantageous effect on the fixing of the encircling seal 5. FIG. 1 shows the additional control valve device in the closed state.

FIG. 2 is a schematically simplified and enlarged illustration of the detail A from FIG. 1. The encircling seal 5, which has a circular cross section, generally has a diameter d in the range of 2 to 5 mm, depending on the size of the additional control valve device and the pressure ratios prevailing in it. If, if the closed state of the additional control valve device, the valve plate 3a bears against the valve seat 3a', a deformation a in the range of about approx. 0.1 mm should be realized. As a result, a relatively high sealing action is achieved even in the case of relatively high pressures in the additional control valve device.

FIG. 3 illustrates the additional control valve device three-dimensionally in longitudinal section. The arrangement of the gantry magnet 1 in the housing 4 is particularly clear here. The illustration of the inner parts of the additional control valve device has also been omitted here for reasons concerned with clarity.

Figure 4A:
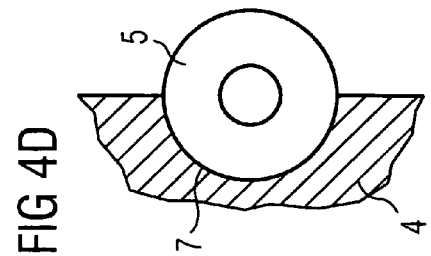
FIG. 4a) to d) shows alternative refinements of the encircling seal in the arranged state.
Figure 4B:
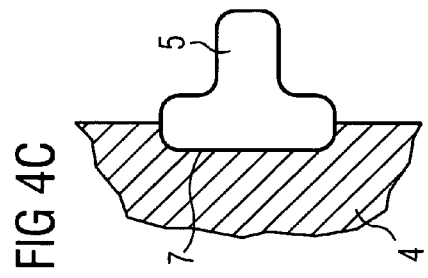
Figure 4C:
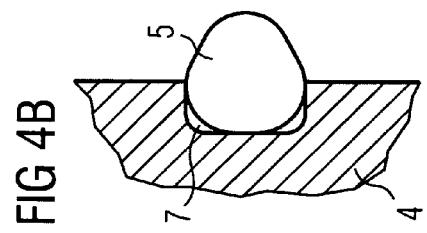
Figure 4D:
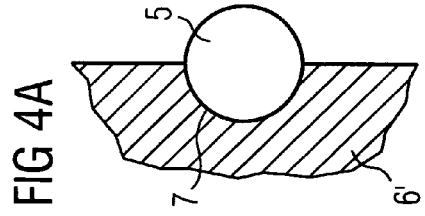

FIG. 4a) to d) illustrate alternative refinements of the encircling seal 5. In FIG. 4a), the encircling seal 5 has a circular cross section and is arranged in an encircling groove 7 which is arranged completely in a further metallic shaped insert 6' belonging to the housing (not illustrated). This further metallic shaped insert 6' may be, for example, of annularly encircling design in a similar manner to the metallic shaped insert in FIG. 1. It is advantageous in this case that the subunit, formed from the further metallic shaped insert 6' and the encircling seal 5, can be manufactured in advance and made available for retrofitting purposes. The further metallic shaped insert 6' is then to be regarded as belonging to the housing (not illustrated). The encircling seal 5 illustrated in each case in FIGS. 4b) to d) is arranged in the housing 4 which in each case has an encircling groove 7. The particular design of the encircling seal in respect of its cross-sectional shape depends on the particular conditions in the additional control valve device. It is particularly advantageous in this case for the additional control valve device to be suitable for many intended purposes, for example for a relatively wide spectrum of compressive forces, caused by different types of engine. The arrangement of the encircling seal 5 at the same time reduces the negative influence of manufacturing tolerances during the manufacturing of the valve element and valve seat on the tightness while simultaneously improving the damping properties of the system. If there is a rigid stop between two metallic components, as is the case, for example, in additional control valve devices according to the prior art, this cannot be realized.

Figure 5:
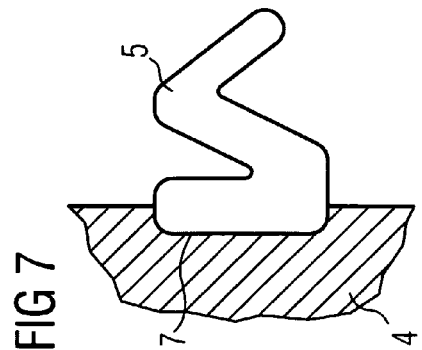
FIG. 5 shows the arrangement of an encircling seal together with a projection in a cutout designed in a complementary manner to the projection.

FIG. 5 illustrates the arrangement of an encircling seal together with a projection 5' in the housing 4, the encircling groove 7, which is arranged in the housing 4, having a cutout 7' designed in a complementary manner to the projection 5'. In this case, the encircling seal 5 can be pressed with its projection 5' in a relatively simple manner into the cutout 7', of complementary design, of the encircling groove 7, so that the arrangement of adhesives can be omitted even in the case of a relatively high application of force. However, it is also possible for the projection 5' and the cutout 7', designed in a complementary manner to the projection 5', to be of different design in terms of structure. For example, various angular arrangements are possible here.

Figure 6:
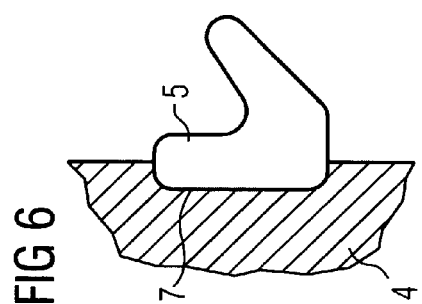
FIG. 6 shows the arrangement of the seal in the form of a lip seal.

FIG. 6 illustrates the arrangement of the encircling seal 5 in the form of a lip seal. It is particularly advantageous if relatively high damping properties are required.

Figure 7:
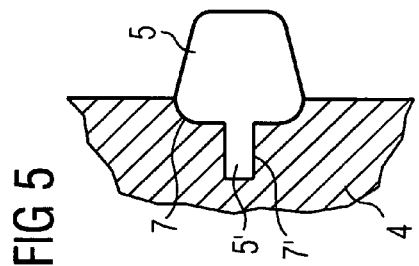
FIG. 7 shows the arrangement of a seal having an S-shaped cross section.

FIG. 7 shows the arrangement of an encircling seal in the housing 4, which seal has an S-shaped cross section. It is particularly advantageous if very high damping properties are required.

The invention claimed is:

1. An additional control valve device for an inlet duct of a piston-type internal combustion engine, comprising: a valve element having a valve plate, the valve element guided between a gantry magnet and a trapping magnet in a reversibly movable manner in a direction of a longitudinal axis, in which an encircling seal is arranged on a side of a housing in which the gantry magnet is arranged and in which the encircling seal faces the valve plate of the valve element.

2. The additional control valve device according to claim 1, wherein the encircling seal is bounded on one side by a metallic shaped insert which is fixed on the housing.

3. The additional control valve device according to claim 1, wherein the encircling seal is arranged in an encircling groove.

4. The additional control valve device according to claim 3, wherein the encircling seal has a projection, and the encircling groove has a cutout designed in a complementary manner to the projection.

5. The additional control valve device according to claim 1, wherein the encircling seal comprises a flat ring seal.

6. The additional control valve device according to claim 1, wherein the encircling seal comprises a lip seal.

7. The additional control valve device according to claim 1, wherein the encircling seal comprises an S-shaped cross section.

8. The additional control valve device according to claim 2, wherein the encircling seal is arranged in an encircling groove.

9. The additional control valve device according to claim 8, wherein the encircling seal comprises a flat ring seal.

10. The additional control valve device according to claim 8, wherein the encircling seal comprises a lip seal.

11. The additional control valve device according to claim 8, wherein the encircling seal comprises an S-shaped cross section.

12. An additional control valve device for an inlet duct of a piston-type internal combustion engine, comprising: a valve element between a gantry magnet and e trapping magnet in a reversibly movable manner in a direction of a longitudinal axis, in which an encircling seal is arranged on a side of a housing in which the gantry magnet is arranged and which faces the valve element, wherein the encircling seal is arranged in an encircling groove, and wherein the encircling groove is arranged completely in a further metallic shaped insert belonging to the housing.

13. An additional control valve device for an inlet duct of a piston-type internal combustion engine, comprising: a valve element between a gantry magnet and a trapping magnet in a reversibly movable manner in a direction of a longitudinal axis, in which an encircling seal is arranged on a side of a housing in which the gantry magnet is arranged and which faces the valve element, wherein the seal is bounded on one side by a metallic shaped insert which is fixed on the housing, wherein the seal is arranged in an encircling groove, and wherein the encircling groove is arranged completely in a further metallic shaped insert belonging to the housing.

14. The additional control valve device according to claim 13, wherein the encircling seal has a projection, and the encircling groove has a cutout designed in a complementary manner to the projection.

15. The additional control valve device according to claim 14, wherein the encircling seal comprises a flat ring seal.

16. The additional control valve device according to claim 15, wherein the encircling seal comprises a lip seal.

17. An additional control valve device for an inlet duct of a piston-type internal combustion engine, comprising: a valve element between a gantry magnet and a trapping magnet in a reversibly movable manner in a direction of a longitudinal axis, in which an encircling seal is arranged on a side of a housing in which the gantry magnet is arranged and which faces the valve element, wherein the seal is bounded on one side by a metallic shaped insert which is fixed on the housing, wherein the seal is arranged in an encircling groove, wherein the encircling seat has a projection, and wherein the encircling groove has a cutout designed in a complementary manner to the projection.

* * * * *